Sept. 22, 1970   E. WULLSCHLEGER   3,529,388
SANITATION INSTALLATION UNIT

Filed March 11, 1969   4 Sheets-Sheet 2

INVENTOR
E. WULLSCHLEGER

BY *Jacobi & Davidson*

ATTORNEYS

United States Patent Office 3,529,388
Patented Sept. 22, 1970

3,529,388
SANITATION INSTALLATION UNIT
Eugen Wullschleger, Bleichemattstrasse 15,
Aarau, Switzerland
Filed Mar. 11, 1969, Ser. No. 806,113
Claims priority, application Switzerland, Mar. 14, 1968,
3,908/68
Int. Cl. A47k 3/16; E04c 2/52
U.S. Cl. 52—220
9 Claims

ABSTRACT OF THE DISCLOSURE

A sanitation installation unit for mounting riser and distributor conduits, wall elements, sanitation and plumbing elements, and, if desired, air ducts in structures, such as buildings or the like which comprises a substantially box-like frame means. A respective substantially rectangular frame portion formed of individual members and defining the respective top and bottom surfaces of said box-like frame means is adapted to be secured in an opening of the brickwork of the building. Each frame portion is provided with at least two elements forming substantially parallelly extending lengthwise supports provided with positioning means substantially uniformly distributed throughout the length of each lengthwise support, and there are means for supporting said lengthwise supports at the brickwork. Furthermore, a number of structural components define conduit clamp means provided for the frame portions, these conduit clamp means being operably connected at their respective ends with said positioning means of two associated lengthwise supports. The conduit axes defined by the conduit clamp means containing, independently of the diameter of the conduits to be connected, predetermined points of intersection of an imaginary grid system consisting of grid lines extending perpendicular to one another. Additionally, vertically extending connecting support means provided with positioning means operably interconnect the rectangular frame portions with one another.

BACKGROUND OF THE INVENTION

The present invention relates to a new and improved sanitation installation unit for mounting riser- and distributor conduits, wall elements, sanitation and plumbing elements, and, if desired, also air ducts or shafts, in structures such as buildings or the like.

It is already known to the art to employ for the construction of apartment buildings prefabricated sanitation installation blocks in which there are contained the plumbing or sanitation riser- and distribution conduits for an apartment. Since the entire installation block is already prefabricated in the factory or workshop and it is only necessary to couple together the pipe conduits at the construction site, it is possible to achieve a considerable rationalization in the installation work.

In a known installation block of the prior art there is provided a box-like frame in which there are contained the sanitation riser- and distribution conduits for an apartment. The frame of this installation block is secured to an intermediate or partition wall, since its dimensions do not enable it to be embedded in the brickwork. Consequently, the frame must be covered at three sides. Apart from the fact that a box which protrudes from the wall is neither very pleasing to the eye nor practical, this installation block possesses the further drawback that it must already be delivered prefabricated to the construction site. This is because a rational and exact welding together of the components is not possible at the construction site. However, the transport and the storage of prefabricated installation blocks at the site of the building which is to be constructed requires a relatively large amount of space.

SUMMARY OF THE INVENTION

Accordingly, it is a primary object of the present invention to provide a new and improved sanitation installation unit of the aforementioned type which effectively overcomes the previously enumerated drawbacks of the prior art constructions.

Another, more specific object of the present invention relates to an improved installation unit of the mentioned type which is relatively simple in construction, can be easily assembled at the construction site, therefore minimizing transportation and storage problems, and provides for an extremely quick, rational, expedient, economical and secure mounting of ascending pipes and conduits of the plumbing, wall elements, sanitation elements, and if desired, also air ducts or conduits, in the buildings or other structures under construction.

Still a further significant object of the present invention relates to the provision of an improved installation unit which is relatively simple in construction, economical to manufacture, thereby lending itself to mass production, and extremely easy to assemble, wherefore is can be readily shipped in dismantled condition to the construction site, quickly assembled there and mounted at the appropriate opening or location of the brickwork without any great effect or complicated operating procedure.

Now, in order to implement there and still further objects of the invention, which will become more readily apparent as the description proceeds, the inventive exemplary embodiment of sanitation installation unit described herein is manifested by the features that it comprises a substantially box-like frame means formed of threadably connected or otherwise interconnected individual members equipped with positioning means. The top and bottom surfaces of the box-like frame means is formed by a respective rectangular frame portion adapted to be secured in an opening of the brickwork of a building or the like. Each of these frame portions is provided with at least two elements forming substantially parallelly extending lengthwise supports, each of said lengthwise supports being provided with said positioning means substantially uniformly distributed throughout the length of each lengthwise support. There is also provided means for supporting these lengthwise supports at the brickwork. Furthermore, a number of structural components defining conduit clamp means are provided for the frame portions, these conduit clamp means being operably connected at their respective ends with the positioning means of two associated lengthwise supports. Furthermore, the conduit axes defined by the conduit clamp means contains, independently of the diameter of the conduits to be connected or mounted, predetermined points of intersection of an imaginary grid system, consisting of grid lines extending perpendicular to one another. Furthermore, substantially vertical connecting support means likewise provided with positioning means operably interconnect the rectangular frame portions with one another.

According to a further aspect of the invention, it is advantageous if the structural components forming the conduit clamp means are operatively connected at their ends with the positioning means of the lengthwise supports through the agency of a pair of transverse supports which extend at least approximately perpendicular to the lengthwise supports.

BRIEF DESCRIPTION OF THE DRAWINGS

The invention will be better understood, and objects other than those set forth above, will become apparent, when consideration is given to the following detailed description thereof. Such description makes reference to the annexed drawings depicting an exemplary embodiment of inventive installation and wherein.

DESCRIPTION OF THE PREFERRED EMBODIMENTS

Figure 1:
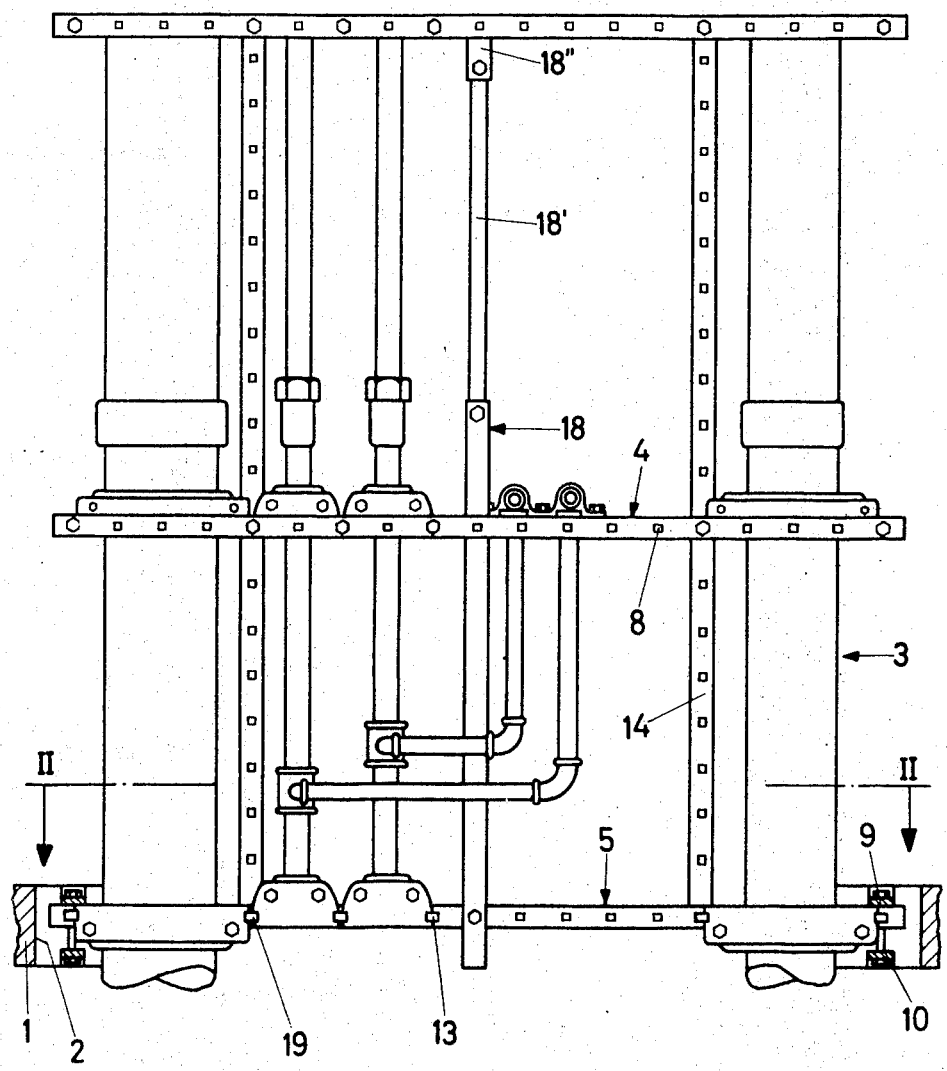
FIG. 1 is a side view partly in section of the inventive installation unit.

Describing now the drawings, in FIG. 1 reference numeral 1 generally designates the floor of the story of a building, whereby this floor 1 is provided with, for instance a substantially rectangular opening or throughpassage 2 for the vertically ascending plumbing or sanitation riser conduits which are to be installed. As will be more fully explained hereinafter, the depicted embodiment of installation unit of the invention possesses a substantially box-shaped frame means or unit 3 formed of threadably connected or otherwise suitably interconnected individual members or components provided with positioning openings, and wherein the cover- and bottom surfaces are formed by a respective upper grid-shaped frame portion 4 and a lower frame portion 5 secured and leveled in the opening 2, for the purpose of mounting the ascending or rising conduits at predetermined spacing from one another in the opening of the brickwork. The substantially rectangular frame portions 4 and 5 each possess two parallely extending lengthwise supports or carriers 6 and 7 provided with suitable positioning openings 8 which are uniformly distributed over their entire length. These lengthwise supports 6 and 7 of the lower frame portion 5 are secured at their ends by means of transverse struts 9 and 10 in the floor opening 2. Furthermore, it will be understood that for the purpose of leveling the unit it will be possible to use vertical extending leveling means, such as leveling screws, arranged at the ends of the lengthwise supports 6 and 7, but which for convenience in illustration have been omitted from the drawings. In order to maintain the size of the opening 2 as small as possible, the lower frame portion 5 can be also arranged above the floor 1 of the story of the building.

Figure 2:
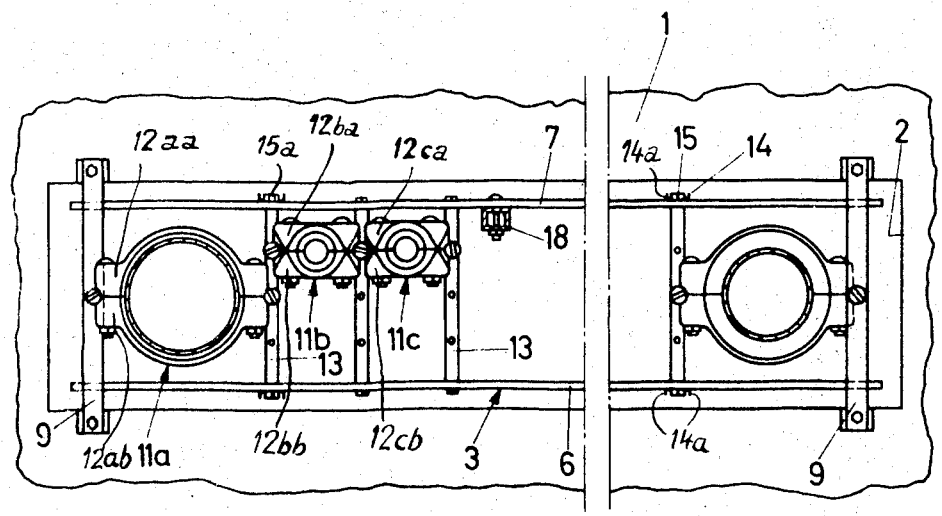
FIG. 2 is a cross-sectional view of the installation unit depicted in FIG. 1, taken along the line II—II thereof.
Figure 3:
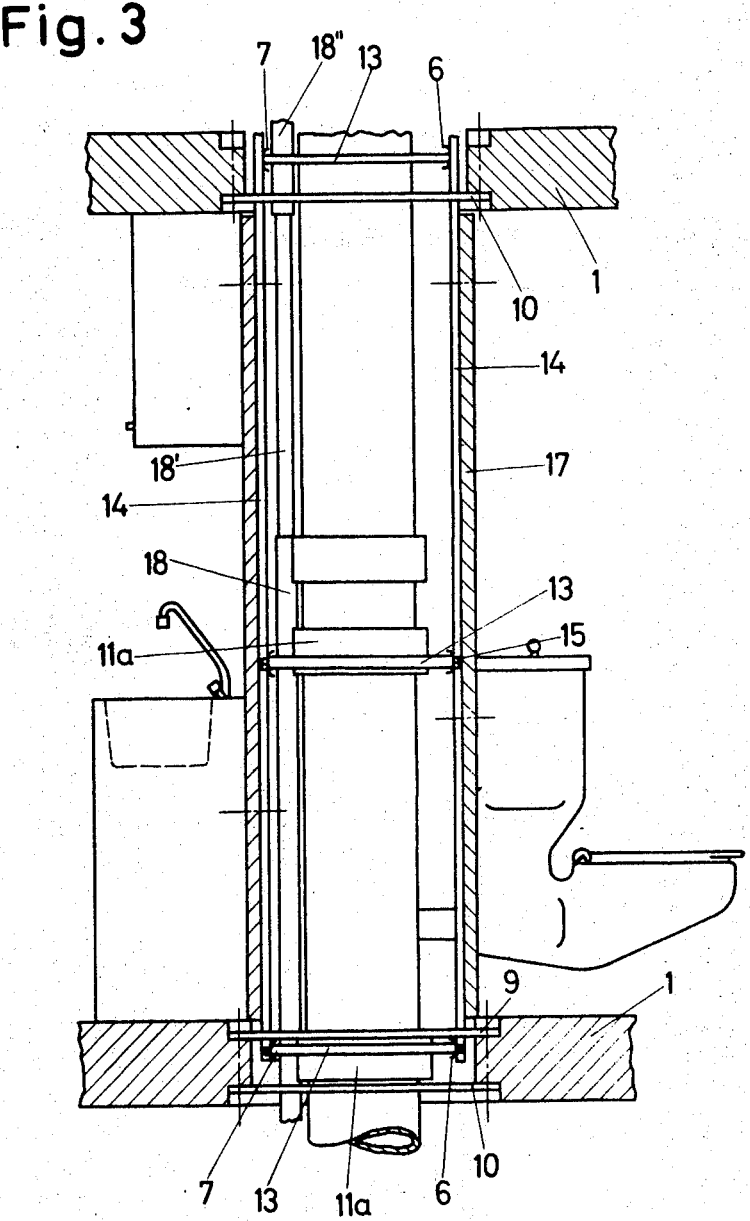
FIG. 3 is an end view of the installation unit depicted in FIGS. 1 and 2 showing same in its mounted or installed position.

The structural elements or components 12aa, 12ab and 12ba, 12bb and 12ca, 12cb, and so forth forming the conduit clamp means 11a and 11b and 11c, and so forth, respectively, are connected at their ends via two respective transverse supports or carriers 13 with the lengthwise supports or carriers 6 and 7, with said transverse supports 13 extending perpendicular to the aforementioned lengthwise supports 6 and 7, as best shown by referring to FIG. 2. Due to this construction of the frame portions or components which are threaded together or otherwise interconnected from prefabricated individual members or elements, it is possible to form a flexible grid system which can be individually accommodated in very simple fashion to all requirements. Furthermore, it should be understood that the conduit axes defined by the conduit clamp means contain, independently of the diameter of the conduits to be mounted or connected, predetermined points of intersection of an imaginary grid system consisting of grid lines extending perpendicular to one another.

Continuing, it will be understood that both frame portions 4 and 5 are coupled with one another via suitable connecting support or carrier means 14 which serve for supporting and mounting distributor conduits, wall elements, and sanitation elements.

Furthermore, the lengthwise supports 6 and 7, as well as the connecting support means 14, for reasons of strength, consist of substantially U-shaped profile material, and the transverse supports or carriers 13 are formed of substantially square-shaped hollow profile members. These U-shaped connecting support means 14 are arranged and constructed in such a fashion that their leg portions 14a (FIG. 2) extend past the screw head 15 of the associated fastening screw 15a, or equivalent fastening expedient, arranged between such legs 14a, so that these legs can be used for supporting the wall elements 17.

Furthermore, the frame means or unit 3 is provided with vertically extending, pipe-shaped and telescopically arranged connecting element means or rods 18, for interconnecting two installation units arranged in superimposed fashion above one another, wherein the upper portion 18' of the lower installation unit can be inserted and threaded into the lower portion 18" of the upper installation unit. These connecting rod means 18 can be simultaneously used for connecting the wall elements 17 and sanitation or plumbing units, such as, for instance, kitchen units.

Figure 4:
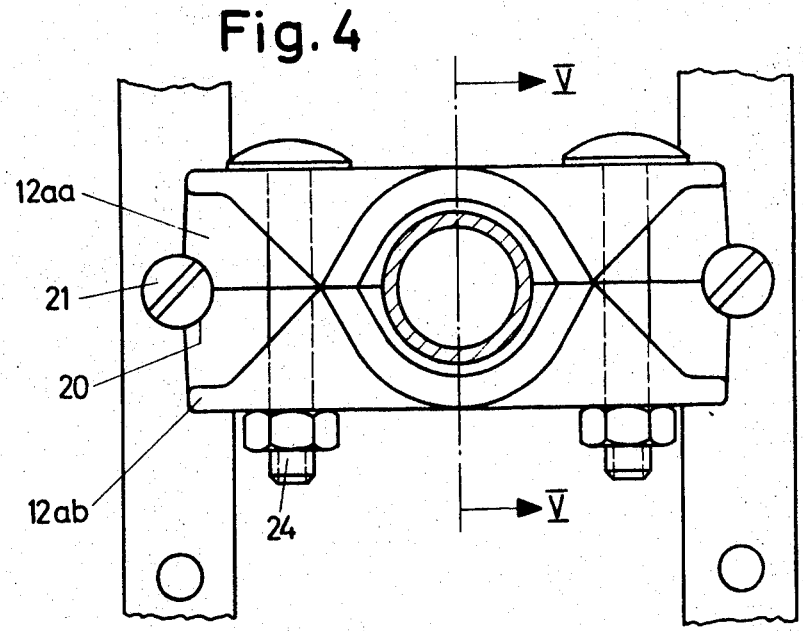
FIG. 4 is an enlarged fragmentary top plan view of an exemplary embodiment of conduit clamp means with the conduit inserted therein.

As best observed by referring to the bottom region of FIG. 1, the conduit clamp means 11a, 11b, 11c, and so forth, are each provided with two parallely extending recesses 19 which are directed perpendicular to the axis of the conduit which is to be mounted and have a cross-section which substantially corresponds to the square or quadrangular-shaped cross-section of the associated transverse support or carrier element 13. Furthermore, as best recognized by referring to FIG. 4, each such conduit clamp means 11a, 11b, and 11c, and so forth is divided into two clamp portions, such as the portions 12aa, and 12ab, along a plane which is disposed perpendicular to the lengthwise axis of the transverse supports 13. Moreover, each such conduit clamping means at the parting plane or surface at the region of each associated recess 19 is provided with a respective recess 20 which extends parallel to the lengthwise axis of the pipe or conduit to be mounted for the purpose of receiving a respective positioning screw member 21 or equivalent structure which is arranged at the associated transverse support or carrier 13.

Figure 5:
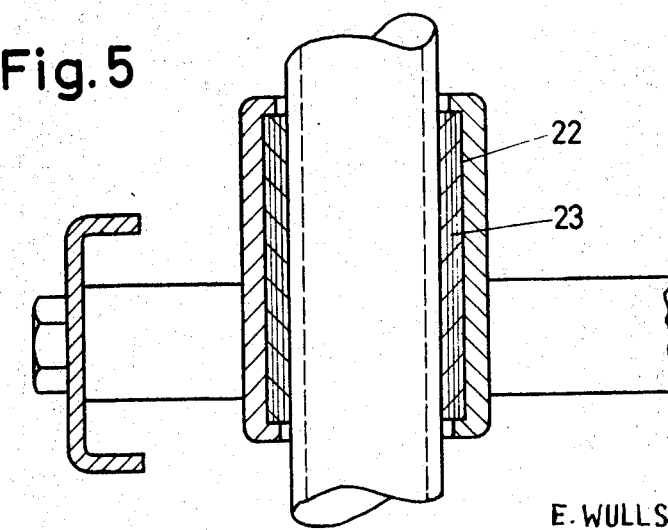
FIG. 5 is a sectional view taken substantially along the lines V—V of the conduit clamp unit depicted in FIG. 4.

In order to reduce the transmission of vibrations and heat to the transverse supports 13, these conduit clamp means, as best seen by referring to FIG. 5, are each provided with a ring-shaped recess 22 for receiving an exchangeable insulation ring 23 formed of two halves and which surrounds the conduit to be supported. The conduit clamp means and the insulation ring 23 are advantageously constructed in such a fashion that the same conduit clamp means can be used for different conduit diameters by merely inserting different dimensioned insulation ring members 23.

Due to the grid-shaped construction of the frame portions, there is insured, upon using the described installation unit, that the conduits assume a predetermined relative position with respect to one another. This relative position can be achieved in all of the stories of the building by carrying out an aligned or coinciding assembly of the installation units by means of the connecting rods 18. It is therefore possible to mount the prefabricated branch conduits without any further fitting work. The inventive installation unit can be constructed with respect to its width in accordance with the wall thickness. If the kitchen and the bathroom are arranged next to one another, then, it is possible, for instance, to mount the installation unit in the common partition wall, and at one side to secure the complete kitchen unit and at the other side cover plates at the frame unit or means 3. All of the attachment or securing elements for plumbing or sanitation units of any type, such as for instance wash basins, bath tubs, toilets, and so forth, are directly secured to the frame means 3 by means of bolts or equivalent fastening devices. Furthermore, the branch conduits can be secured to the connecting supports 14 for instance, in order to provide for an exact positioning and attachment thereof.

The installation unit of the invention permits the preparation of the riser pipe-conduits and their branch pipes or conduits at the workshop or factory and the transportation of the supports and pipe conduits in disassembled condition to the location of the construction site. The individual components of the box-shaped frame means can consist of standarized individual parts. The assembly at the location of the construction site is possible with the use of very simple auxiliary means. The transportation of the disassembled riser pipe-conduits and the frame means requires considerably less storage space than the prepared mounting blocks of the prior art constructions which have been pre-assembled already in the factory.

The inventive sanitation installation unit can be optionally constructed without any additional difficulties, that is to say, for use in apartment houses, hotels, store or office buildings, hospitals, industrial buildings, and so forth, and for use at one or both sides. Moreover, there is complete freedom of choice as to the arrangement of the plumbing or sanitation elements.

The riser- and distribution pipes or conduits can be used for the distribution of gas, cold and hot water, waste water and materials, and so forth, and can be formed of any desired suitable material, such as plastic, cast iron, sheet metal, and so forth.

It should be apparent from the foregoing detailed description that the objects set forth at the outset to the specification have been successfully achieved. Accordingly, what is claimed is:

1. A sanitation installation unit for mounting riser and distributor conduits, wall elements, sanitation and plumbing elements, air ducts and the like in structures, such as buildings and the like, comprising a substantially box-like frame means, said box-like frame means being composed of interconnection individual members equipped with positioning means, a respective substantially rectangular frame portion formed of individual members and defining the respective top and bottom surfaces of said box-like frame means and adapted to be secured in an opening of the brickwork of the building, each of said frame portions being provided with at least two elements forming substantially parallely extending lengthwise supports, each of said lengthwise supports being provided with said positioning means substantially uniformly distributed throughout the length of each lengthwise support, means for supporting said lengthwise supports at said brickwork, a number of structural components defining conduit clamp means provided for said frame portions, said conduit clamp means being operably connected at their respective ends with said positioning means of two associated lengthwise supports, the conduit axes defined by said conduit clamp means containing, independently of the diameter of the conduits to be connected, predetermined points of intersection of an imaginary grid system consisting of grid lines extending perpendicular to one another, and vertically extending connecting support means provided with positioning means for operably interconnecting said rectangular frame portions with one another.

2. A sanitation installation unit as defined in claim 1, further including a pair of transverse supports which extend at least approximately perpendicular to said lengthwise supports for operatively connecting at their ends said structural components defining said conduit clamp means with said positioning means of said lengthwise supports.

3. A sanitation installation unit as defined in claim 2, wherein said lengthwise supports and said connecting support means are each formed of substantially U-shaped profile material, said transverse supports being formed of substantially square-like hollow profile material, said substantially U-shaped connecting support means being arranged in such a fashion that their legs extend past connecting means arranged therebetween for supporting wall elements.

4. A sanitation installation unit as defined in claim 2, wherein said conduit clamp means are each provided with two substantially parallel recesses which substantially correspond to the cross-section of said transverse supports and extend substantially perpendicular to the axis of the conduit which is to be mounted, each said conduit clamp means being divided into two clamp halves along a plane which is disposed at least approximately perpendicular to the lengthwise axis of said transverse supports, each said conduit clamp means being further provided at the region of the parting surface with a respective recessed portion extending parallel to the lengthwise axis of the conduit to be mounted for receiving a respective positioning means arranged at an associated transverse support, and at least a pair of fastening means extending perpendicular to said parting surface for fastening together both clamp halves.

5. A sanitation installation unit as defined in claim 4, wherein said fastening means comprise fastening screws.

6. A sanitation installation unit as defined in claim 5, wherein each of said conduit clamp means is provided with a substantially ring-shaped recess for receiving an exchangeable insulation ring consisting of two halves adapted to be fastened about a conduit to be mounted.

7. A sanitation installation unit as defined in claim 1, further including vertically extending connecting element means for operably connecting one installation unit with a further installation unit arranged thereabove in superimposed fashion.

8. A santitation installation unit as defined in claim 7, wherein said vertically extending connecting element means comprise substantially pipe-shaped telescopic members.

9. A sanitation installation unit for mounting riser and distributor conduits, wall elements, sanitation and plumbing elements, air ducts and the like in structures, such as buildings and the like, comprising a substantially box-like frame means, a respective substantially rectangular frame portion formed of individual members and defining the respective top and bottom surfaces of said box-like frame means and adapted to be secured in an opening of the brickwork of the building, each of said frame portions being provided with at least two elements forming substantially parallel extending lengthwise supports, each of said lengthwise supports being provided with positioning means substantially uniformly distributed throughout the length of each lengthwise support, means for supporting said lengthwise supports at said brickwork, a number of structural components defining conduit clamp means provided for said frame portions, said conduit clamp means being operably connected at their respective ends with said positioning means of two associated lengthwise supports, the conduit axes defined by said conduit clamp means containing, indepedently of the diameter of the conduits to be connected, predetermined points of intersection of an imaginary grid system consisting of grid lines extending perpendicular to one another, and vertically extending connecting support means provided with positioning means for operably interconnecting said rectangular frame portions with one another.

References Cited

UNITED STATES PATENTS

| | | | |
|---|---|---|---|
| 2,419,319 | 4/1947 | Lankton | 52—79 X |
| 2,653,357 | 9/1953 | Sanders et al. | 52—34 X |
| 2,660,270 | 11/1953 | Jenkins et al. | 52—34 X |
| 2,787,027 | 4/1957 | Baker | 52—34 X |
| 3,162,277 | 12/1964 | Markle | 52—221 X |
| 3,221,454 | 12/1965 | Togni | 52—35 X |
| 3,230,549 | 1/1966 | McMurtrie et al. | 52—79 X |

PRICE C. FAW, Jr., Primary Examiner

U.S. Cl. X.R.

4—2; 52—34, 122